United States Patent
Smith et al.

(10) Patent No.: US 7,126,534 B2
(45) Date of Patent: Oct. 24, 2006

(54) MINIMUM SAFE ALTITUDE WARNING

(75) Inventors: Alexander E. Smith, McLean, VA (US); Jonathan C. Baldwin, Alexandria, VA (US)

(73) Assignee: Rannoch Corporation, Alexandria, VA (US)

( * ) Notice: Subject to any disclaimer, the term of this patent is extended or adjusted under 35 U.S.C. 154(b) by 0 days.

(21) Appl. No.: 10/756,799

(22) Filed: Jan. 14, 2004

(65) Prior Publication Data

US 2004/0222916 A1   Nov. 11, 2004

Related U.S. Application Data

(63) Continuation-in-part of application No. 10/638,524, filed on Aug. 12, 2003, now Pat. No. 6,806,829, which is a continuation of application No. 09/516,215, filed on Feb. 29, 2000, now Pat. No. 6,633,259, application No. 10/756,799, which is a continuation-in-part of application No. 10/319,725, filed on Dec. 16, 2002, now Pat. No. 6,812,890, which is a continuation-in-part of application No. 10/751,115, filed on Jan. 5, 2004, now Pat. No. 6,992,626, application No. 10/756,799, which is a continuation-in-part of application No. 10/743,042, filed on Dec. 23, 2003, application No. 10/756,799, which is a continuation-in-part of application No. 10/457,439, filed on Jun. 10, 2003.

(60) Provisional application No. 60/534,706, filed on Jan. 8, 2004, provisional application No. 60/440,618, filed on Jan. 17, 2003, provisional application No. 60/343,237, filed on Dec. 31, 2001, provisional application No. 60/123,170, filed on Mar. 5, 1999.

(51) Int. Cl.
   *G01S 13/93* (2006.01)

(52) U.S. Cl. ..................... 342/456; 342/462
(58) Field of Classification Search ............... 342/455, 342/456, 462, 30, 37; 701/117, 120
See application file for complete search history.

(56) References Cited

U.S. PATENT DOCUMENTS

| | | | | |
|---|---|---|---|---|
| 3,668,403 A | | 6/1972 | Meilander | 701/121 |
| 3,705,404 A | | 12/1972 | Chisholm | 343/112 R |
| 3,792,472 A | * | 2/1974 | Payne et al. | 342/32 |
| 4,167,006 A | | 9/1979 | Funatsu et al. | 343/6.5 LC |

(Continued)

FOREIGN PATENT DOCUMENTS

JP    9-288175 A    11/1994

(Continued)

OTHER PUBLICATIONS

Traffic Alert System Technical Design Summary, Final Report, Apr. 1994 (Baldwin et al.).

(Continued)

*Primary Examiner*—Dao Phan
(74) *Attorney, Agent, or Firm*—Robert Platt Bell

(57) ABSTRACT

A ground-based CFIT warning system provides pilots with CFIT alerts. The system is based upon a ground-based tracking system, which provides surveillance of aircraft, such as the AirScene™ multilateration system manufactured by Rannoch Corporation of Alexandria, Va. The system monitors both horizontal and vertical positions of aircraft. When an aircraft has been determined to be operating below safe altitudes, or too close to obstructions, the pilot is provided with a warning. The warning may be delivered via the pilot's voice communications and/or a data link or the like.

62 Claims, 2 Drawing Sheets

U.S. PATENT DOCUMENTS

| | | | |
|---|---|---|---|
| 4,196,474 A | 4/1980 | Buchanan et al. | 364/461 |
| 4,224,669 A * | 9/1980 | Brame | 701/8 |
| 4,229,737 A | 10/1980 | Heldwein et al. | 343/6 R |
| 4,359,733 A | 11/1982 | O'Neill | 342/36 |
| 4,454,510 A | 6/1984 | Crow | 343/5 |
| 4,524,931 A | 6/1985 | Nilsson | 246/167 |
| 4,646,244 A * | 2/1987 | Bateman et al. | 701/301 |
| 4,688,046 A | 8/1987 | Schwab | 342/456 |
| 4,782,450 A | 11/1988 | Flax | 364/461 |
| 4,914,733 A | 4/1990 | Gralnick | 340/961 |
| 5,075,694 A | 12/1991 | Donnangelo et al. | 342/455 |
| 5,144,315 A | 9/1992 | Schwab et al. | 342/49 |
| 5,153,836 A | 10/1992 | Fraughton et al. | 364/461 |
| 5,191,342 A | 3/1993 | Alsup et al. | 342/465 |
| 5,260,702 A * | 11/1993 | Thompson | 340/970 |
| 5,262,784 A | 11/1993 | Drobnicki et al. | 342/45 |
| 5,268,698 A | 12/1993 | Smith et al. | 342/450 |
| 5,283,574 A * | 2/1994 | Grove | 340/970 |
| 5,317,316 A * | 5/1994 | Sturm et al. | 342/30 |
| 5,365,516 A | 11/1994 | Jandrell | 370/18 |
| 5,374,932 A | 12/1994 | Wyschogrod et al. | 342/36 |
| 5,381,140 A | 1/1995 | Kuroda et al. | 340/961 |
| 5,402,116 A | 3/1995 | Ashley | 340/870.1 |
| 5,454,720 A | 10/1995 | FitzGerald et al. | 434/27 |
| 5,506,590 A * | 4/1996 | Minter | 342/462 |
| 5,528,244 A | 6/1996 | Schwab | 342/37 |
| 5,570,095 A | 10/1996 | Drouilhet, Jr. et al. | 342/357 |
| 5,596,326 A | 1/1997 | Fitts | 342/30 |
| 5,596,332 A | 1/1997 | Coles et al. | 342/455 |
| 5,627,546 A | 5/1997 | Crow | 342/352 |
| 5,629,691 A | 5/1997 | Jain | 340/961 |
| 5,666,110 A * | 9/1997 | Paterson | 340/970 |
| 5,680,140 A | 10/1997 | Loomis | 342/357 |
| 5,714,948 A | 2/1998 | Farmakis et al. | 340/961 |
| 5,752,216 A | 5/1998 | Carlson et al. | 701/120 |
| 5,774,829 A | 6/1998 | Cisneros et al. | 701/213 |
| 5,781,150 A | 7/1998 | Norris | 342/357 |
| 5,867,804 A | 2/1999 | Pilley et al. | 701/120 |
| 5,999,116 A | 12/1999 | Evers | 342/36 |
| 6,049,304 A | 4/2000 | Rudel et al. | 342/357.08 |
| 6,085,150 A | 7/2000 | Henry et al. | 701/301 |
| 6,094,169 A | 7/2000 | Smith et al. | 342/465 |
| 6,133,867 A | 10/2000 | Eberwine et al. | 342/29 |
| 6,208,284 B1 * | 3/2001 | Woodell et al. | 342/30 |
| 6,211,811 B1 | 4/2001 | Evers | 342/36 |
| 6,219,592 B1 | 4/2001 | Muller et al. | 701/9 |
| 6,292,721 B1 | 9/2001 | Conner et al. | 701/9 |
| 6,314,363 B1 | 11/2001 | Pilley et al. | 701/120 |
| 6,347,263 B1 | 2/2002 | Johnson et al. | 701/14 |
| 6,380,870 B1 | 4/2002 | Conner et al. | 340/970 |
| 6,384,783 B1 | 5/2002 | Smith et al. | 342/387 |
| 6,445,310 B1 * | 9/2002 | Bateman et al. | 340/970 |
| 6,448,929 B1 | 9/2002 | Smith et al. | 342/456 |
| 6,463,383 B1 | 10/2002 | Baiada et al. | 701/120 |
| 6,469,664 B1 | 10/2002 | Michaelson et al. | 342/357.13 |
| 6,477,449 B1 | 11/2002 | Conner et al. | 701/4 |
| 6,571,155 B1 | 5/2003 | Carriker et al. | 701/3 |
| 6,606,034 B1 | 8/2003 | Muller et al. | 340/970 |
| 6,633,259 B1 | 10/2003 | Smith et al. | 342/456 |
| 6,789,011 B1 | 9/2004 | Baiada et al. | 701/120 |
| 6,873,903 B1 | 3/2005 | Baiada et al. | 701/120 |
| 2002/1001247 | 2/2002 | Smith et al. | 342/450 |
| 2003/0009267 A1 | 1/2003 | Dunsky et al. | 701/4 |
| 2004/0225432 A1 | 11/2004 | Pilley et al. | 701/117 |

FOREIGN PATENT DOCUMENTS

| | | | |
|---|---|---|---|
| JP | 6-342061 A | 12/1994 | |
| JP | 8-146130 A | 5/1996 | |
| JP | 9-119983 A | 11/1996 | |

OTHER PUBLICATIONS

Airscene, The complete Air Traffic Picture in Real Time, www.airscene.com, Rannoch Corporation, Alexandria, Virginia, undated.

GPS Relative Accuracy for Collision Avoidance, Institute of Navigation Technical Meeting, Jan. 1997 (Rudel et al.).

Cassell, R., Smith A., Cohen, B., Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic For Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

AERMOD: Description of Model Formulation (Version 02222) EPA 454/R-02-002d, Oct. 21, 2002.

FAA Integrated Noise Model, www.faa.gov, current release INM 6.1 (Mar. 4, 2003).

"Flight Explorer News: Flight Explorer and Lochard Team to Provide Enhanced Flight Tracking for Customers Worldwide", Apr. 28, 2003, http://www.flightexplorer/com/News/press%20releases/pr042803.asp.

Source Code received by Rannoch Corp. from FAA, circa 1998.

"A Routine that converts an American Mode S address into its corresponding 'N' number string", Ken Banis, Feb. 17, 1992/.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

"ADSE and Multilateration Mode-S Data Fusion for Location and Identification on Airport Surface", J.G. Herraro J.A. Portas, F.J. Rodriguez, (*IEEE 1999 Radar Conference Proceedings*, pp. 315-320, Apr. 20-22, 1999).

D.C. Rickard, D.J. Sherry, S.J. Taylor, "The development of a prototype aircraft-height monitoring unit utilising an SSR-based difference in time of arrival technique", International Conference Radar 92 (Conf. Publ. No. 365), 1992, p. 250-3.

D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.

Request for Proposal for Acquisition of Airport Noise and Operations Monitoring System (NOMS), Indianapolis Airport Authority, Oct. 21, 2003.

Technical Specifications, for a Aircraft Flight Track and Noise Management System for the Regional Airport Authority of Louisville and Jefferson County Prepared by: Harris Miller Miller & Hanson Inc. 15 New England Executive Park Burlington, MA 01803 HMMH Report No. 298950, May 16, 2003.

Application of CNS/ATM Technologies to Airport Management, Alex Smith & Jon Baldwin, Rannoch Corporation, 1800 Diagonal Rd, Suite 430, Alexandria, VA 22314, USA (undated).

"Overview of the FAA ADS-B Link Decision", John Scardina, Director, Office of System Architecture and Investment Analysis, Federal Aviation Administration, Jun. 7, 2002.

Automated Correlation of Aircraft Flight Tracks and Events with ATC Data, Alex Smith, Rannoch Corporation, 1800 Diagonal Rd, Suite 430, Alexandria, VA 22314, USA (undated).

"Ground-Based Transceiver (GBT) For Broadcast Services Using the Universal Access Transceiver (UAT) Data Link", FAA-E-2973, Department of Transportation, Federal Aviation Administration, Jan. 15, 2004.

"The Future of Alerts ADS-B Seminar", Mark Palm, Thales Melbourne, Thales Air Systems Division, undated.

"Wide Area Multilateration Report on EATMP TRS 131/04 Version 1.0", NLR-CR-2004-472, Roke Manor Research, Nov. 2004.

Protest Letter dated May 16, 2002 from Otto M. Wildensteiner, U.S. Department of Transportation, Washington, DC.

"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependant Surveillance Broadcast (ADS-B)", RCTA, Inc. Washington, DC, ©1998.

"Runway Incursion Reduction Program Dallas-Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrent Wilson, RCTA SC-186, Aug. 17, 1995, RTCA Paper No. 449-95/SC186-033.

"The Universal Access Tranceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program" Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Committee 186, Working Group 5 ADS-B UAT MOPS Meeting #2, Proposed Contents and Transmission Rates for ADS-B Messages" Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

* cited by examiner

MINIMUM SAFE ALTITUDE WARNING

CROSS-REFERENCE TO RELATED APPLICATIONS

The present application is a Continuation-In-Part application of U.S. patent application Ser. No. 10/638,524, filed Aug. 12, 2003 now U.S. Pat. No. 6,806,829, entitled "METHOD AND APPARATUS FOR IMPROVING THE UTILITY OF AUTOMATIC DEPENDENT SURVEILLANCE", which is incorporated herein by reference in its entirety, which in turn is a Continuation of U.S. patent application Ser. No. 09/516,215, filed on Feb. 29, 2000 now U.S. Pat. No. 6,633,259, which in turn claims priority from Provisional Application Ser. No. 60/123,170, filed Mar. 5, 1999, both of which are incorporated herein by reference in its entirety.

The present application is also a Continuation-In-Part of U.S. patent application Ser. No. 10/319,725, filed Dec. 16, 2002 now U.S. Pat. No. 6,812,890, entitled "VOICE RECOGNITION LANDING FEE BILLING SYSTEM", incorporated herein by reference in its entirety, which in turn claims priority from Provisional U.S. Patent No. 60/343,237, filed Dec. 31, 2001, also incorporated by reference in its entirety.

The present application is also a Continuation-In-Part of U.S. patent application Ser. No. 10/457,439, filed Jun. 10, 2003 entitled "Correlation of Flight Track Data with Other Data Source", incorporated herein by reference in its entirety.

The present application is also a Continuation-In-Part of U.S. patent application Ser. No. 10/751,115, filed on Jan. 5, 2004 now U.S. Pat. No. 6,992,626, entitled "Method and Apparatus to Correlate Aircraft Flight Tracks and Events with Relevant Airport Operations Information" which in turn claims priority from Provisional U.S. Patent Application Ser. No. 60/440,618, filed Jan. 17, 2003, incorporated herein by reference in its entirety.

The present application also claims priority from Provisional U.S. Patent Application Ser. No. 60/440,618, filed Jan. 17, 2003, incorporated herein by reference in its entirety.

The present application is also a Continuation-In-Part of U.S. patent application Ser. No. 10/743,042, filed Dec. 23, 2003 entitled "METHOD AND APPARATUS FOR ACCURATE AIRCRAFT AND VEHICLE TRACKING" (Alexander E. Smith et al.), incorporated herein by reference.

The present application also claims priority from Provisional U.S. Patent Application Ser. No. 60/534,706, filed Jan. 8, 2004, incorporated herein by reference in its entirety.

The subject matter of the present application is related to the following issued U.S. Patents, assigned to the same assignee as the present invention, all of which are incorporated herein by reference in their entirety:

U.S. Pat. No. 6,049,304, issued Apr. 11, 2000, entitled "Method and Apparatus for Improving the Accuracy of Relative Position Estimates In a Satellite-Based Navigation System";

U.S. Pat. No. 5,999,116, issued Dec. 7, 1999, entitled "Method and Apparatus for Improving the Surveillance Coverage and Target Identification in a Radar Based Surveillance System";

U.S. Pat. No. 6,094,169, issued Jul. 25, 2000, entitled "Passive Multilateration Auto-Calibration and Position Error Correction";

U.S. Pat. No. 6,384,783, issued on May 7, 2002, entitled "Method and Apparatus for Correlating Flight Identification Data With Secondary Surveillance Radar Data";

U.S. Pat. No. 6,633,259, issued Oct. 14, 2003, entitled "METHOD AND APPARATUS FOR IMPROVING THE UTILITY OF AUTOMATIC DEPENDENT SURVEILLANCE";

U.S. Pat. No. 6,211,811, issued Apr. 2, 2001, entitled "Method and Apparatus for Improving the Surveillance Coverage and Target Identification in a Radar Based Surveillance System";

U.S. Pat. No. 6,448,929, issued Sep. 10, 2002, entitled "Method and Apparatus for Correlating Flight Identification Data With Secondary Surveillance Radar Data"; and U.S. Pat. No. 6,567,043, issued May 20, 2003, entitled "METHOD AND APPARATUS FOR IMPROVING THE UTILITY OF AUTOMATIC DEPENDENT SURVEILLANCE".

FIELD OF THE INVENTION

The present invention relates to system for terrain avoidance for aircraft. In particular, the present invention is directed toward a warning system for warning a pilot when an aircraft approaches a minimum safe altitude.

BACKGROUND OF THE INVENTION

Controller Flight Into Terrain (CFIT) is one of the leading causes of aviation accidents. When pilots lack situational awareness, it is possible to fly an aircraft, under control, into the ground. CFIT can occur in a number of circumstances. During Instrument Approaches, if a pilot falls below the target flight path, the aircraft may collide with terrain or other obstructions. However, many CFIT incidents also occur in clear weather. In these incidents, pilot distraction or unfamiliarity with a particular airport may cause a CFIT accident to occur.

The risk of such accidents can be greatly reduced through the installation of CFIT avionics, which warn the flight crew when they are at risk of a CFIT accident. However, such avionics are cost-prohibitive for installations on smaller aircraft, including typical general aviation aircraft. In such aircraft, additional aviation electronics adds to the weight and clutter of the cockpit area.

While there are CFIT systems available on the market, such as those from Honeywell Corporation (www.honeywell.com), they all rely upon the aircraft being equipped with a specific device known as a ground proximity warning system. Ground proximity warning systems rely on the combination of an on-board terrain database, an accurate navigation system, and logic to estimate potential collisions with the ground or terrain. If the on-board database is not current, then a proper proximity warning may not be given. Thus, for example, if a tower or building is recently constructed near an airport, and the database on the plane is not updated to reflect this new addition, the system might not provide a warning when a collision with such an object is imminent.

Other relevant Honeywell references include: U.S. Pat. No. 6,606,034, issued Aug. 12, 2003, entitled, "Terrain awareness system"; U.S. Pat. No. 6,571,155, issued May 27, 2003, entitled, "Assembly, computer program product and method for displaying navigation performance based flight path deviation information"; U.S. Pat. No. 6,477,449, issued Nov. 5, 2002, entitled "Methods, apparatus and computer program products for determining a corrected distance between an aircraft and a selected runway"; U.S. Pat. No. 6,469,664, issued Oct. 22, 2002, entitled "Method, apparatus, and computer program products for alerting surface vessels to hazardous conditions"; U.S. Pat. No. 6,445,310, issued Sep. 3, 2002, entitled "Apparatus, methods, computer program products for generating a runway field clearance floor envelope about a selected runway", U.S. Pat. No. 6,380,870, issued Apr. 30, 2002, entitled "Apparatus, methods, and computer program products for determining a look ahead distance value for high speed flight"; U.S. Pat. No. 6,347,263, issued Jan. 12, 2002, entitled "Aircraft terrain information system"; U.S. Pat. No. 6,292,721, issued Sep. 18, 2001, entitled "Premature descent into terrain visual awareness enhancement to EGPWS"; and U.S. Pat. No. 6,219,592, issued Apr. 17, 2001, entitled "Method and apparatus for terrain awareness", all of which are incorporated herein by reference.

Another technique for detection of an aircraft potential collision with terrain is the FAA's Minimum Safe Altitude Warning (MSAW) system where the air traffic controller is notified when the barometric reported altitude of an aircraft falls below a threshold set for the geographic locations of the aircraft, as reported by radar (See: www.FAA.gov). The problem with this system is that it relies upon the barometric pressure calibration on the aircraft transponder of each aircraft. Moreover, the system adds to the load of an air traffic controller if they are required to give verbal warnings. As with any system with a man in the loop, it may be subject to mishap, and moreover any warnings may be given too late.

Moreover, the increased use of electronics in the cockpit has resulted in increased workload for the cockpit crew as various navigation, collision avoidance, and other electronics need to be tended to and monitored. A CFIT system adds to this electronic workload by providing yet another system which a pilot needs to monitor.

Thus, it remains a requirement in the art to provide protection for aircraft not provided with special CFIT avionics or other types of safety monitoring equipment.

In the United States, for example, there are over 2,000 commercial aircraft which are generally well-equipped with avionics devices, but over 200,000 General Aviation Aircraft which are lesser equipped, and would benefit from any system which can make use of ground-based systems which datalink information up to the pilot. Such a system would provide the advantages of state of the art avionics to most of these General Aviation aircraft at a far lower cost than conventional airborne avionics.

SUMMARY OF THE INVENTION

A ground-based CFIT warning system provides pilots with CFIT alerts. The system is based upon a ground-based tracking system, which provides surveillance of aircraft, such as the AirScene™ multilateration system manufactured by Rannoch Corporation of Alexandria, Va. The system monitors both horizontal and vertical positions of aircraft. When an aircraft has been determined to be operating below safe altitudes, or too close to obstructions, the pilot is provided with a warning. The warning may be delivered via the pilot's voice communications and/or a data link or the like.

The method and apparatus of the present invention offer many advantages over the prior art of record. For example, the system of the present invention does not require any special aircraft equipage other than conventional transponders and radio gear. The present invention provides warnings directly to the pilot (not to an air traffic controller). The present invention can also work where there is limited or no conventional radar coverage (such as small municipal airports or the like). Moreover, the present invention can use either (or both) barometric or calculated altitude to determine proximity warnings.

The concept of the present invention may also be applied to other types of collision warning systems. In particular, the present invention can track multiple aircraft and provide warnings if two or more aircraft appear to be on a collision course, and advise each pilot of appropriate action to take. The apparatus of the present invention may also be used to prevent collisions on the ground with other aircraft or service vehicles or the like. A pilot may be warned when an aircraft or vehicle is in the path or on a collision course with the aircraft. The present invention can also be used to warn pilots if they are violating noise profile contours, noise abatement procedures, or the like, and thus help reduce airport noise complaints.

DETAILED DESCRIPTION OF THE INVENTION

Figure 1:
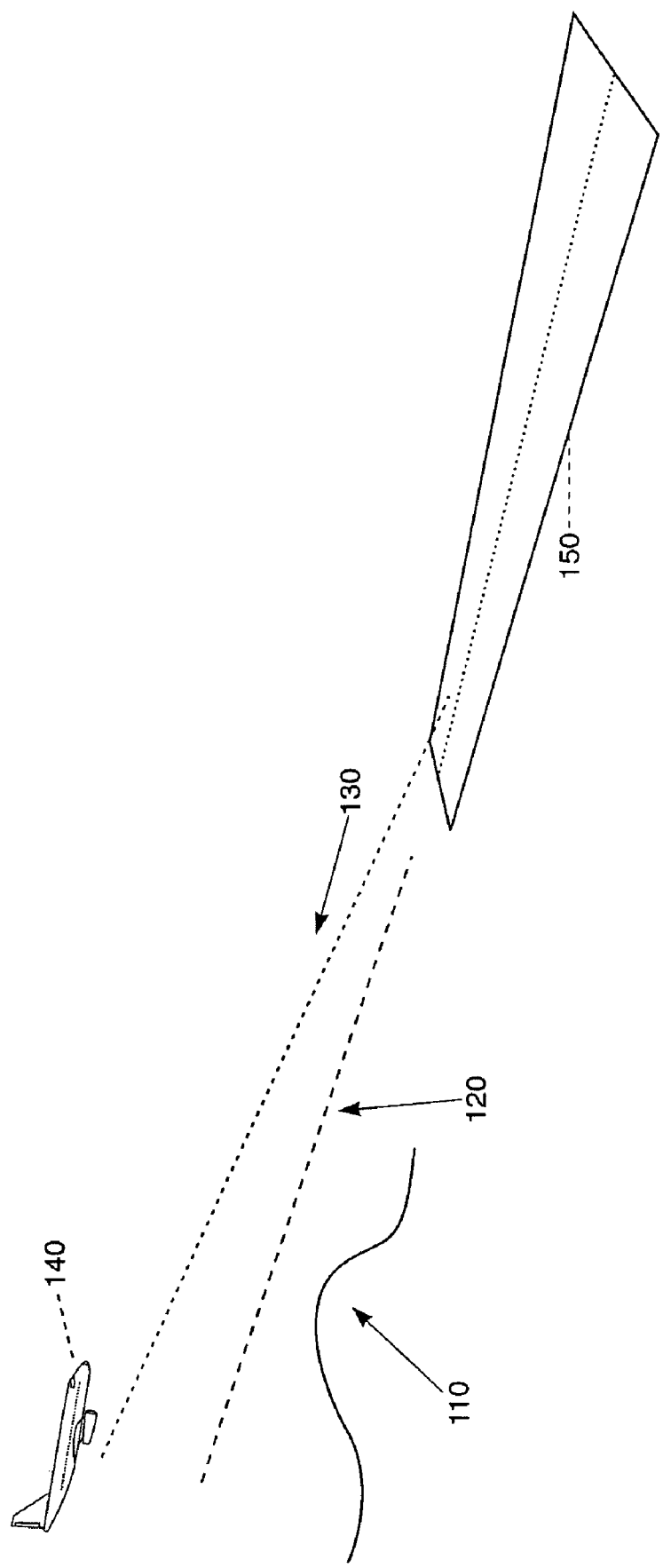
FIG. 1 is a diagram illustrating the approach path of an airplane to a runway, showing the minimum save altitude level relative to terrain.

FIG. 1 is a diagram illustrating the approach path of an airplane to a runway, showing the minimum save altitude level relative to terrain. Aircraft 140 is on final approach to runway 150 taking approach path 130. Terrain 110 may include obstacles such as mountains, towers, buildings or the like. In order to prevent a controlled flight into terrain (CFIT) accident, a minimum safe altitude profile 120 may be established for each airport, according to FAA records and other information. In Prior Art on-board systems, this minimum safe altitude profile 120 may be stored in a database and a warning sounded if aircraft 140 drops below this minimum safe altitude at any time while on approach 130.

Figure 2:
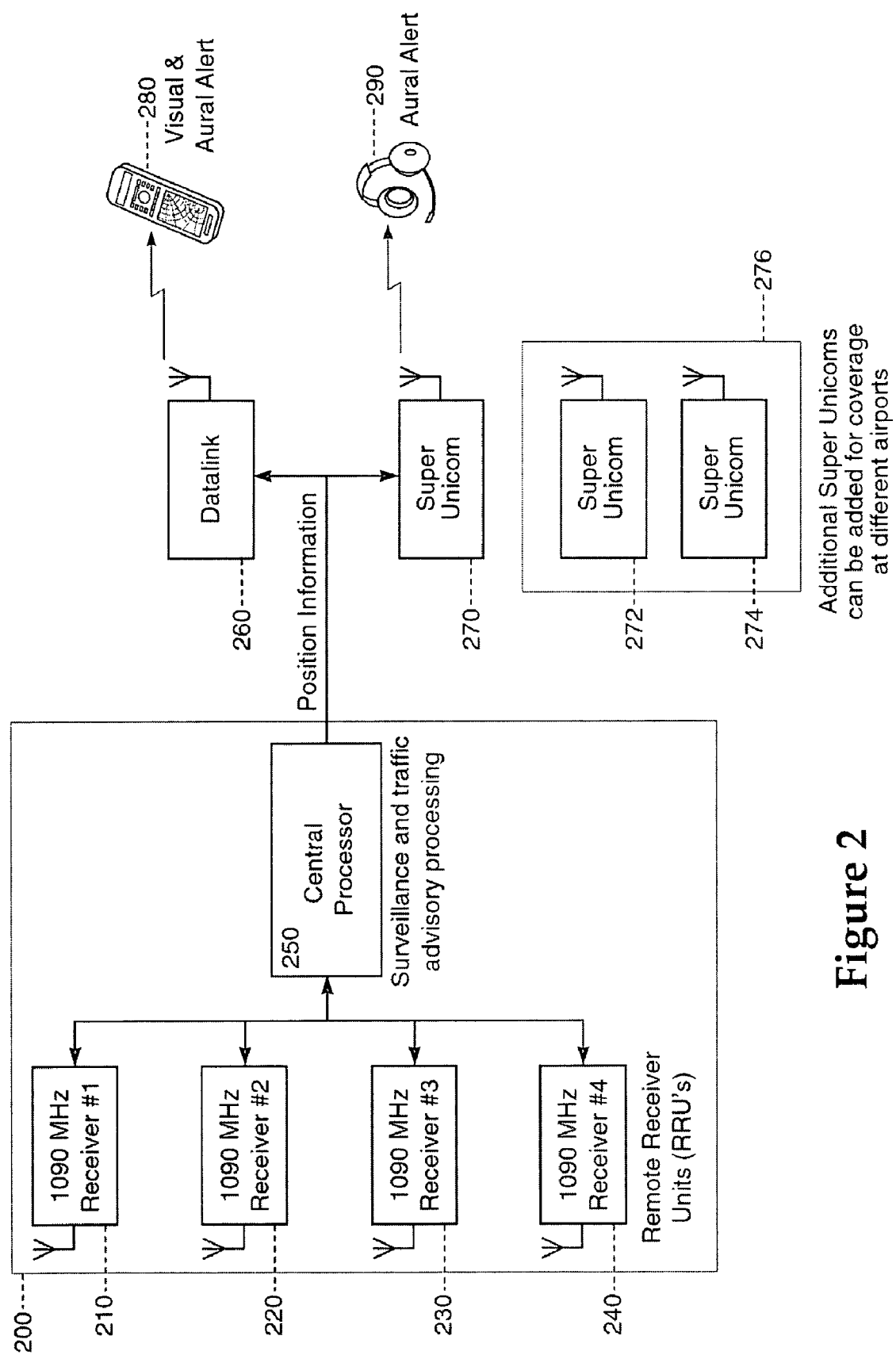
FIG. 2 is a block diagram illustrating the major components of the apparatus of the present invention.

FIG. 2 is a block diagram illustrating the major components of the apparatus of the present invention. Unlike the Prior Art, which relies upon on-board solutions, the present invention may track aircraft 140 using a 2 or 3-dimensional multilateration, which may track the aircraft as it approaches or departs the airport.

As illustrated in FIG. 1, the position of aircraft 140 may be tracked relative to a safe altitude 120 designated for that area. Should the aircraft descend below that altitude 120 or show intent to do so the system can automatically generate an alert, which will be passed to the pilot using a variety of datalinks including voice frequencies.

Referring to FIG. 2, a multilateration system 200 may be provided with a central processor 250 and a plurality of remote receiver units 210, 220, 230, and 240. Based upon differential time of receipt of radio messages (such as transponder messages) from an aircraft and the multiple remote receiver units 210, 220, 230, and 240, central processor can determine quite accurately the position of an aircraft in two or three dimensions, as well as the course, heading and speed of the craft.

Detailed description of the multilateration system is omitted here for clarity. The above-captioned Rannoch Corporation Patents and pending applications, incorporated by reference disclose the operation of a multilateration system. Moreover, one of ordinary skill in the art can appreciate and understand how such systems work. Different numbers of remote receiver units 210, 220, 230, and 240 may be used depending upon application, desired accuracy, and the like. Four are shown for purposes of illustration only.

It should also be noted that the present invention could be adapted to use other types of aircraft tracking systems including, but not limited to, radar systems (active and passive) as well as reported GPS positions and the like. The main point is that position warning information is output from block 200.

Central processor 250 may be suitably modified to include an MSAW database of minimum safe altitudes for areas surrounding an airport or other area of tracking coverage (e.g., the multilateration system coverage area). Central processor compares the position of aircraft 140 as determined by the multilateration system and outputs a signal to datalink 260 and or Super Unicom 270 if aircraft 140 appears to be below the minimum safe altitude.

In addition, central processor 250 may determine if an aircraft appears to be on a course, which may imminently take it below the minimum safe altitude. As noted above, the present invention may also track multiple aircraft and provide warnings if two aircraft are in close proximity, on collision (or near miss) courses, or the like. In addition, an aircraft's position can be tracked on the ground and warnings generated if the aircraft appears to be headed for a ground obstruction, service vehicle, or other hazard. The system could also warn pilots if they are off centerline of the runway, off course, landing on the wrong runway or a taxiway, or the like. In the primary embodiment, however, minimum safe altitude is the primary parameter that is checked.

If it is determined that aircraft 140 is below the minimum safe altitude or approaching the minimum safe altitude (or other warning parameter as previously discussed), then a warning may be sent to the pilot via Super Unicom (or other radio link) 270 to pilot headset 290. This warning may comprise a computer generated audio message broadcast on the working frequency or frequencies of a particular airport or air traffic area. To prevent confusion, the warning may include identification information to identify a particular aircraft by tail number or flight number. A sample of such a warning message could be "N1727AXA you are approaching minimum safe altitude, pull up!"

Aircraft tail number or other identifying information may be retrieved from the transponder code or other identifying indicia, including voice communication data, as described in many of the aforementioned incorporated Patents. In addition to voice commands, other types of warnings may be used such as audio tones, beeps, and other indicators. Additional Super Unicoms 276 (comprising units 272, 274 and the like) may be used for coverage at different airports in a single region (e.g., National, Dulles, BWI) or to operate on different working frequencies.

A visual and aural alert may also be transmitted to a pilot by datalink 260. Datalink 260 may comprise any one of a number of known data transmission systems for aircraft, or a unique system developed for the present invention. In the preferred embodiment, datalink 260 may comprise, for example a digital data path on any approved frequency such as a digital VHF or Universal Access Transceiver frequencies such as in the 900–1000 MHz Band.

Warnings may be displayed on a cockpit display 290 which may comprise a GPS display, aircraft tracking display, or other device, or simply a cockpit warning light. A visual display may color the flight path on the display in a warning color, provide a text message, or simply flash. In addition to the visual display, a audio alert may be generated. The audio alert may comprise a buzzer, beep or other sound, or may comprise a computer generated voice message or the like.

Unlike the prior art, which requires that an aircraft be equipped with a rather cumbersome, expensive and heavy computer system to detect when the craft is below minimum safe altitude, the present invention can operate with existing aircraft with little or no modification whatsoever. If an aircraft has only a transponder and a radio, it can receive minimum safe altitude and other warnings from the system of the present invention.

The system operates in a manner totally transparent to the pilot such that the pilot may not even be aware the system is present unless a warning condition is present. Thus, the pilot is not distracted with yet another instrument to monitor and maintain during flight.

Moreover, by providing a ground-based system, the present invention limits the number of databases, which need to be updated with obstacle data. Rather than update the databases for every aircraft equipped with an on-board MSAW system, as in the Prior Art, in the present invention only the local airport system database need be updated. This update can be automated to receive data from the FAA or other central database, or input data from local airport managers, who generally have a better understanding of local obstructions.

The use of the passive multilateration system of the present invention allows the system to be installed, in one embodiment, without any interface to existing airport equipment, in particular, air traffic control (ATC) radar. The system of the present invention may be installed off-site from the airport and thus need not be maintained by airport personnel. The system of the present invention lends itself well to smaller municipal and private airports where many general aviation and small commuter craft may be present, many of which may not be equipped with MSAW equipment. As the present invention may also be used to warn of noise profile violations, it may also help smaller airports reduce noise complaints. This latter feature may be particularly useful to owners and operators of smaller airports. As development encroaches upon the space surrounding such smaller airports, they are often targeted for closure by local residents and the like due to noise concerns.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A ground-based system for tracking and warning aircraft, comprising:
   a ground-based system for tracking at least one aircraft to determine aircraft position and altitude;
   a ground-based system for comparing aircraft position and altitude to at least one predetermined criteria to determine whether the at least aircraft should be warned; and
   means for warning the at least one aircraft.

2. The system of claim 1, wherein the ground-based system for tracking comprises a 3-D multilateration system for determining aircraft position and altitude.

3. The system of claim 1, wherein the ground-based system for tracking comprises a 2-D multilateration system for determining aircraft position and a means for receiving transponder data to determine aircraft altitude.

4. The system of claim 1, wherein the ground-based system for tracking comprises an active radar system.

5. The system of claim 1, wherein the ground-based system for tracking comprises a passive radar system.

6. The system of claim 2, wherein the 3-D multilateration system determines aircraft position, altitude, track and speed.

7. The system of claim 3, wherein the 2-D multilateration system determines aircraft position, track, and speed.

8. The system of claim 1, wherein the ground-based system for comparing aircraft position and altitude to at least one predetermined criteria to determine whether the at least aircraft should be warned comprises means for comparing the at least one aircraft position and altitude to a minimum safe altitude profile and determining that the at least one aircraft should be warned if the altitude of the at least one aircraft is approaching or below that of a minimum safe altitude for the position of the at least one aircraft.

9. The system of claim 1, wherein the ground-based system for comparing aircraft position and altitude to at least one predetermined criteria to determine whether the at least aircraft should be warned comprises means for comparing the position and altitude of a first of the at least one aircraft with the position and altitude of a second of at least one aircraft and determining that the at least one aircraft should be warned if the position and altitude of the first of the at least one aircraft and the position and altitude of the second of the at least one aircraft are within a predetermined range of one another.

10. The system of claim 1, wherein the ground-based system for comparing aircraft position and altitude to at least one predetermined criteria to determine whether the at least aircraft should be warned comprises means for comparing the at least one aircraft position and altitude to an airport noise profile and determining that the at least one aircraft should be warned if the position and altitude of the at least one aircraft is approaching or exceeding a boundary of the airport noise profile.

11. The system of claim 1, wherein the means for warning the at least one aircraft comprises a means for generating an audio radio message to the at least one aircraft so that a pilot of the at least one aircraft is audibly warned.

12. The system of claim 1, wherein the means for warning the at least one aircraft comprises a means for generating a visual message to the at least one aircraft so that a pilot of the at least one aircraft is visually warned.

13. The system of claim 12, wherein the means for warning the at least one aircraft comprises a digital data link to the aircraft, wherein digital warning data are broadcast to the aircraft from the ground, and the digital warning data is displayed on an aircraft cockpit display.

14. The system of claim 2, wherein the ground-based system for comparing aircraft position and altitude to at least one predetermined criteria to determine whether the at least aircraft should be warned comprises means for comparing the at least one aircraft position and altitude to a minimum safe altitude profile and determining that the at least one aircraft should be warned if the altitude of the at least one aircraft is approaching or below that of a minimum safe altitude for the position of the at least one aircraft.

15. The system of claim 2, wherein the ground-based system for comparing aircraft position and altitude to at least one predetermined criteria to determine whether the at least aircraft should be warned comprises means for comparing the position and altitude of a first of the at least one aircraft with the position and altitude of a second of at least one aircraft and determining that the at least one aircraft should be warned if the position and altitude of the first of the at least one aircraft and the position and altitude of the second of the at least one aircraft are within a predetermined range of one another.

16. The system of claim 2, wherein the ground-based system for comparing aircraft position and altitude to at least one predetermined criteria to determine whether the at least aircraft should be warned comprises means for comparing the at least one aircraft position and altitude to an airport noise profile and determining that the at least one aircraft should be warned if the position and altitude of the at least one aircraft is approaching or exceeding a boundary of the airport noise profile.

17. The system of claim 2, wherein the means for warning the at least one aircraft comprises a means for generating an audio radio message to the at least one aircraft so that a pilot of the at least one aircraft is audibly warned.

18. The system of claim 2, wherein the means for warning the at least one aircraft comprises a means for generating a visual message to the at least one aircraft so that a pilot of the at least one aircraft is visually warned.

19. The system of claim 18, wherein the means for warning the at least one aircraft comprises a digital data link to the aircraft, wherein digital warning data are broadcast to the aircraft from the ground, and the digital warning data is displayed on an aircraft cockpit display.

20. The system of claim 3, wherein the ground-based system for comparing aircraft position and altitude to at least one predetermined criteria to determine whether the at least aircraft should be warned comprises means for comparing the at least one aircraft position and altitude to a minimum safe altitude profile and determining that the at least one aircraft should be warned if the altitude of the at least one aircraft is approaching or below that of a minimum safe altitude for the position of the at least one aircraft.

21. The system of claim 3, wherein the ground-based system for comparing aircraft position and altitude to at least one predetermined criteria to determine whether the at least aircraft should be warned comprises means for comparing the position and altitude of a first of the at least one aircraft with the position and altitude of a second of at least one aircraft and determining that the at least one aircraft should be warned if the position and altitude of the first of the at least one aircraft and the position and altitude of the second of the at least one aircraft are within a predetermined range of one another.

22. The system of claim 3, wherein the ground-based system for comparing aircraft position and altitude to at least one predetermined criteria to determine whether the at least aircraft should be warned comprises means for comparing the at least one aircraft position and altitude to an airport noise profile and determining that the at least one aircraft should be warned if the position and altitude of the at least one aircraft is approaching or exceeding a boundary of the airport noise profile.

23. The system of claim 3, wherein the means for warning the at least one aircraft comprises a means for generating an audio radio message to the at least one aircraft so that a pilot of the at least one aircraft is audibly warned.

24. The system of claim 3, wherein the means for warning the at least one aircraft comprises a means for generating a visual message to the at least one aircraft so that a pilot of the at least one aircraft is visually warned.

25. The system of claim 1, wherein the means for warning the at least one aircraft comprises a digital data link to the aircraft, wherein digital warning data are broadcast to the aircraft from the ground, and the digital warning data is displayed on an aircraft cockpit display.

26. The system of claim 6, wherein the ground-based system for comparing aircraft position and altitude to at least one predetermined criteria to determine whether the at least aircraft should be warned comprises means for comparing the at least one aircraft position, altitude and track to a minimum safe altitude profile and determining that the at least one aircraft should be warned if the position, altitude, and track of the at least one aircraft indicates that the at least one aircraft is approaching or below that of a minimum safe altitude for the position of the at least one aircraft.

27. The system of claim 6, wherein the ground-based system for comparing aircraft position and altitude to at least one predetermined criteria to determine whether the at least aircraft should be warned comprises means for comparing the position, altitude, and track of a first of the at least one aircraft with the position, and altitude, and track of a second of at least one aircraft and determining that the at least one aircraft should be warned if the position, altitude, and track of the first of the at least one aircraft and the position, altitude, and track of the second of the at least one aircraft are within a predetermined range of one another or on course to come within a predetermined range of one another.

28. The system of claim 6, wherein the ground-based system for comparing aircraft position and altitude to at least one predetermined criteria to determine whether the at least aircraft should be warned comprises means for comparing the at least one aircraft position, altitude, and track to an airport noise profile and determining that the at least one aircraft should be warned if the position, altitude, and track indicate that the at least one aircraft is approaching or exceeding a boundary of the airport noise profile.

29. The system of claim 6, wherein the means for warning the at least one aircraft comprises a means for generating an audio radio message to the at least one aircraft so that a pilot of the at least one aircraft is audibly warned.

30. The system of claim 6, wherein the means for warning the at least one aircraft comprises a means for generating a visual message to the at least one aircraft so that a pilot of the at least one aircraft is visually warned.

31. The system of claim 30, wherein the means for warning the at least one aircraft comprises a digital data link to the aircraft, wherein digital warning data are broadcast to the aircraft from the ground, and the digital warning data is displayed on an aircraft cockpit display.

32. A ground-based method for tracking and warning aircraft, comprising the steps of:
    tracking in a ground-based system, at least one aircraft to determine aircraft position and altitude,
    comparing in a ground-based system, aircraft position and altitude to at least one predetermined criteria to determine whether the at least aircraft should be warned, and
    warning the at least one aircraft.

33. The method of claim 32, wherein said step of tracking in a ground-based system comprises 3-D multilateration to determine aircraft position and altitude.

34. The method of claim 32, wherein said step of tracking in a ground-based system comprises 2-D multilateration to determine aircraft position and a receiving transponder data to determine aircraft altitude.

35. The method of claim 32, wherein said step of tracking in a ground-based system comprises the step of tracking using active radar.

36. The method of claim 32, wherein said step of tracking in a ground-based system comprises the step of tracking using passive radar.

37. The method of claim 33, wherein the step of 3-D multilateration determines aircraft position, altitude, track and speed.

38. The method of claim 34, wherein the step of 2-D multilateration determines aircraft position, track, and speed.

39. The method of claim 32, wherein said step of comparing in a ground-based system aircraft position and altitude to at least one predetermined criteria to determine whether the at least aircraft should be warned comprises the steps of:
    comparing the at least one aircraft position and altitude to a minimum safe altitude profile, and
    determining that the at least one aircraft should be warned if the altitude of the at least one aircraft is approaching or below that of a minimum safe altitude for the position of the at least one aircraft.

40. The method of claim 32, wherein said step of comparing in a ground-based system aircraft position and altitude to at least one predetermined criteria to determine whether the at least aircraft should be warned comprises the steps of:
    comparing the position and altitude of a first of the at least one aircraft with the position and altitude of a second of at least one aircraft, and
    determining that the at least one aircraft should be warned if the position and altitude of the first of the at least one aircraft and the position and altitude of the second of the at least one aircraft are within a predetermined range of one another.

41. The method of claim 32, wherein said step of comparing in a ground-based system aircraft position and altitude to at least one predetermined criteria to determine whether the at least aircraft should be warned comprises the steps of:
    comparing the at least one aircraft position and altitude to an airport noise profile, and
    determining that the at least one aircraft should be warned if the position and altitude of the at least one aircraft is approaching or exceeding a boundary of the airport noise profile.

42. The method of claim 32, wherein said step of warning the at least one aircraft comprises the step of generating an audio radio message to the at least one aircraft so that a pilot of the at least one aircraft is audibly warned.

43. The method of claim 32, wherein said step of warning the at least one aircraft comprises the step of generating a visual message to the at least one aircraft so that a pilot of the at least one aircraft is visually warned.

44. The method of claim 43, wherein said step of warning the at least one aircraft comprises the steps of:
    transmitting, over a digital data link, digital warning data to the aircraft from the ground, and
    displaying the digital warning data on an aircraft cockpit display.

45. The method of claim 33, wherein said step of comparing in a ground-based system aircraft position and altitude to at least one predetermined criteria to determine whether the at least aircraft should be warned comprises the steps of:
    comparing the at least one aircraft position and altitude to a minimum safe altitude profile, and
    determining that the at least one aircraft should be warned if the altitude of the at least one aircraft is approaching or below that of a minimum safe altitude for the position of the at least one aircraft.

46. The method of claim 33, wherein said step of comparing in a ground-based system aircraft position and altitude to at least one predetermined criteria to determine whether the at least aircraft should be warned comprises the steps of:
    comparing the position and altitude of a first of the at least one aircraft with the position and altitude of a second of at least one aircraft, and
    determining that the at least one aircraft should be warned if the position and altitude of the first of the at least one aircraft and the position and altitude of the second of the at least one aircraft are within a predetermined range of one another.

47. The method of claim 33, wherein said step of comparing in a ground-based system aircraft position and altitude to at least one predetermined criteria to determine whether the at least aircraft should be warned comprises the steps of:
comparing the at least one aircraft position and altitude to an airport noise profile, and
determining that the at least one aircraft should be warned if the position and altitude of the at least one aircraft is approaching or exceeding a boundary of the airport noise profile.

48. The method of claim 33, wherein said step of warning the at least one aircraft comprises the step of generating an audio radio message to the at least one aircraft so that a pilot of the at least one aircraft is audibly warned.

49. The method of claim 33, wherein said step of warning the at least one aircraft comprises the step of generating a visual message to the at least one aircraft so that a pilot of the at least one aircraft is visually warned.

50. The method of claim 49, wherein said step of warning the at least one aircraft comprises the steps of:
transmitting, over a digital data link, digital warning data to the aircraft from the ground, and
displaying the digital warning data on an aircraft cockpit display.

51. The method of claim 34, wherein said step of comparing in a ground-based system aircraft position and altitude to at least one predetermined criteria to determine whether the at least aircraft should be warned comprises the steps of:
comparing the at least one aircraft position and altitude to a minimum safe altitude profile, and
determining that the at least one aircraft should be warned if the altitude of the at least one aircraft is approaching or below that of a minimum safe altitude for the position of the at least one aircraft.

52. The method of claim 34, wherein said step of comparing in a ground-based system aircraft position and altitude to at least one predetermined criteria to determine whether the at least aircraft should be warned comprises the steps of:
comparing the position and altitude of a first of the at least one aircraft with the position and altitude of a second of at least one aircraft, and
determining that the at least one aircraft should be warned if the position and altitude of the first of the at least one aircraft and the position and altitude of the second of the at least one aircraft are within a predetermined range of one another.

53. The method of claim 34, wherein said step of comparing in a ground-based system aircraft position and altitude to at least one predetermined criteria to determine whether the at least aircraft should be warned comprises the steps of:
comparing the at least one aircraft position and altitude to an airport noise profile, and
determining that the at least one aircraft should be warned if the position and altitude of the at least one aircraft is approaching or exceeding a boundary of the airport noise profile.

54. The method of claim 34, wherein said step of warning the at least one aircraft comprises the step of generating an audio radio message to the at least one aircraft so that a pilot of the at least one aircraft is audibly warned.

55. The method of claim 34, wherein said step of warning the at least one aircraft comprises the step of generating a visual message to the at least one aircraft so that a pilot of the at least one aircraft is visually warned.

56. The method of claim 55, wherein said step of warning the at least one aircraft comprises the steps of:
transmitting, over a digital data link, digital warning data to the aircraft from the ground, and
displaying the digital warning data on an aircraft cockpit display.

57. The method of claim 37, wherein said step of comparing in a ground-based system aircraft position and altitude to at least one predetermined criteria to determine whether the at least aircraft should be warned comprises the steps of:
comparing the at least one aircraft position, altitude and track to a minimum safe altitude profile, and
determining that the at least one aircraft should be warned if the position, altitude, and track of the at least one aircraft indicates that the at least one aircraft is approaching or below that of a minimum safe altitude for the position of the at least one aircraft.

58. The method of claim 37, wherein said step of comparing in a ground-based system aircraft position and altitude to at least one predetermined criteria to determine whether the at least aircraft should be warned comprises the steps of:
comparing the position, altitude, and track of a first of the at least one aircraft with the position, and altitude, and track of a second of at least one aircraft, and
determining that the at least one aircraft should be warned if the position, altitude, and track of the first of the at least one aircraft and the position, altitude, and track of the second of the at least one aircraft are within a predetermined range of one another or on course to come within a predetermined range of one another.

59. The method of claim 37, wherein said step of comparing in a ground-based system aircraft position and altitude to at least one predetermined criteria to determine whether the at least aircraft should be warned comprises the steps of:
comparing the at least one aircraft position, altitude, and track to an airport noise profile, and
determining that the at least one aircraft should be warned if the position, altitude, and track indicate that the at least one aircraft is approaching or exceeding a boundary of the airport noise profile.

60. The method of claim 37, wherein said step of warning the at least one aircraft comprises the step of generating an audio radio message to the at least one aircraft so that a pilot of the at least one aircraft is audibly warned.

61. The method of claim 37, wherein said step of warning the at least one aircraft comprises the step of generating a visual message to the at least one aircraft so that a pilot of the at least one aircraft is visually warned.

62. The method of claim 61, wherein said step of warning the at least one aircraft comprises the steps of:
transmitting, over a digital data link, digital warning data to the aircraft from the ground, and
displaying the digital warning data on an aircraft cockpit display.

* * * * *